US010596946B1

(12) United States Patent
Huntley et al.

(10) Patent No.: US 10,596,946 B1
(45) Date of Patent: Mar. 24, 2020

(54) REMOVABLE DRINK HOLDER

(71) Applicant: T-H Marine Supplies, LLC, Huntsville, AL (US)

(72) Inventors: Jeffery William Huntley, Madison, AL (US); Matt Drudge, Warsaw, IN (US)

(73) Assignee: T-H Marine Supplies, LLC, Huntsville, AL (US)

( * ) Notice: Subject to any disclaimer, the term of this patent is extended or adjusted under 35 U.S.C. 154(b) by 88 days.

(21) Appl. No.: 15/942,732

(22) Filed: Apr. 2, 2018

Related U.S. Application Data

(60) Provisional application No. 62/479,610, filed on Mar. 31, 2017.

(51) Int. Cl.
*A47K 1/08* (2006.01)
*B60N 3/10* (2006.01)
*F16B 21/04* (2006.01)

(52) U.S. Cl.
CPC .............. *B60N 3/103* (2013.01); *F16B 21/04* (2013.01)

(58) Field of Classification Search
CPC ................................ F16B 21/04; B60N 3/103
USPC ................. 248/311.2; 220/495.01, 703, 737; 211/71.01
See application file for complete search history.

(56) References Cited

U.S. PATENT DOCUMENTS 6,315,153 B1 * 11/2001 Osborn .............. A47G 23/0216
220/737
2014/0158848 A1 * 6/2014 Caruso ................... B60N 3/106
248/311.2

* cited by examiner

*Primary Examiner* — Todd M Epps
(74) *Attorney, Agent, or Firm* — Stephen H. Hall; Bradley Arant Boult Cummings LLP

(57) ABSTRACT

Embodiments of a drink holder assembly are disclosed. In one embodiment, the drink holder assembly includes a drink holder and a support holder. The support holder is configured to hold the drink holder such that the drink holder is removeably secured to the support holder. In this manner, the support holder can be fixed or mounted on a vehicle, desk, or building. However, the user can remove the drink holder from the support holder so that the drink holder can be cleaned.

12 Claims, 12 Drawing Sheets

US 10,596,946 B1

REMOVABLE DRINK HOLDER

RELATED APPLICATIONS

This application claims the benefit of provisional patent application Ser. No. 62/479,610, filed Mar. 31, 2017, the disclosure of which is hereby incorporated herein by reference in its entirety.

FIELD OF THE DISCLOSURE

This disclosure relates generally to devices and methods for holding a beverage container.

BACKGROUND

Many cars, trucks, boats, and other recreational vehicles have drink (or beverage) holders built into them so that a user can securely hold a beverage container. Unfortunately, currently known drink holders are generally fixed in place and are not easily removable since removing the drink holder from the structure that supports the drink holder generally damages either the drink holder itself or the supporting structure. This makes currently known drink holders difficult to clean if something spills into the drink holder. Furthermore, drink holders may be exposed to the weather and thus may fill up with water and other fluids. It is difficult to clean these fluids since the drink holder is fixed to the supporting structure within the vehicle.

Thus, what is needed are devices and methods that allow for a drink holder to be more easily cleaned.

SUMMARY

Embodiments of a drink holder assembly are disclosed. In one embodiment, the drink holder assembly includes a drink holder and a support holder. The support holder is configured to hold the drink holder such that the drink holder is removeably secured to the support holder. In this manner, the support holder can be fixed or mounted on a vehicle, desk, or building. However, the user can remove the drink holder from the support holder so that the drink holder can be cleaned.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Throughout this disclosure, relative terminology, such as "approximately," "substantially," "proximate" and the like, may be used in a predicate to describe features and relationships between features of a device or method. The relative terminology in the predicate should be interpreted sensu lato. However, whether the predicate employing the relative terminology is satisfied is determined in accordance to error ranges and/or variation tolerances that are relevant to the predicate and allow the feature or related features described by the predicate to perform their intended function.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

This disclosure relates generally to devices and methods for holding beverage containers. More specifically, embodiments of a drink holder assembly are disclosed, which allow for a beverage container to be held securely within a vehicle, desk, or other structure. However, the drink holder assembly allows for a drink holder to be detached thereby allowing a user to clean the drink holder or carry the beverage container within the drink holder without damaging the structure which it is mounted on. As explained in further detail below, the drink holder assembly may include the drink holder and a support holder. The support holder is configured to hold the drink holder such that the drink holder is removeably secured to the support holder. In this manner, the support holder can be fixed or mounted on the vehicle, desk, or building. However, the user can remove the drink holder from the support holder so that the drink holder can be cleaned. Additionally, the drink holder is portable since the drink holder can be removed without causing damage to the vehicle, desk, or building.

Figure 1:
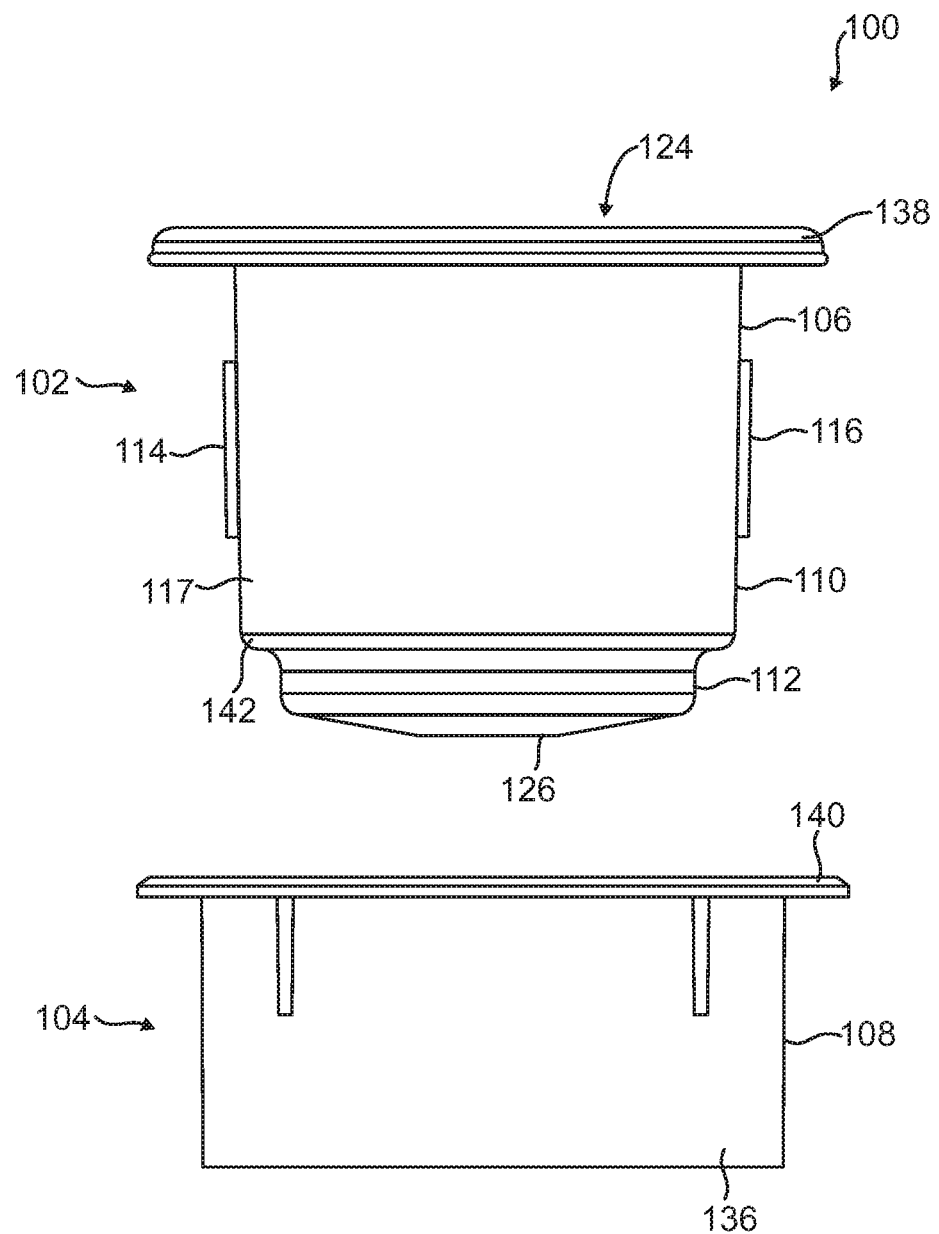
FIG. 1 illustrates one example of a drink holder assembly where the drink holder has been removed from the support holder of the drink holder assembly.
Figure 2:
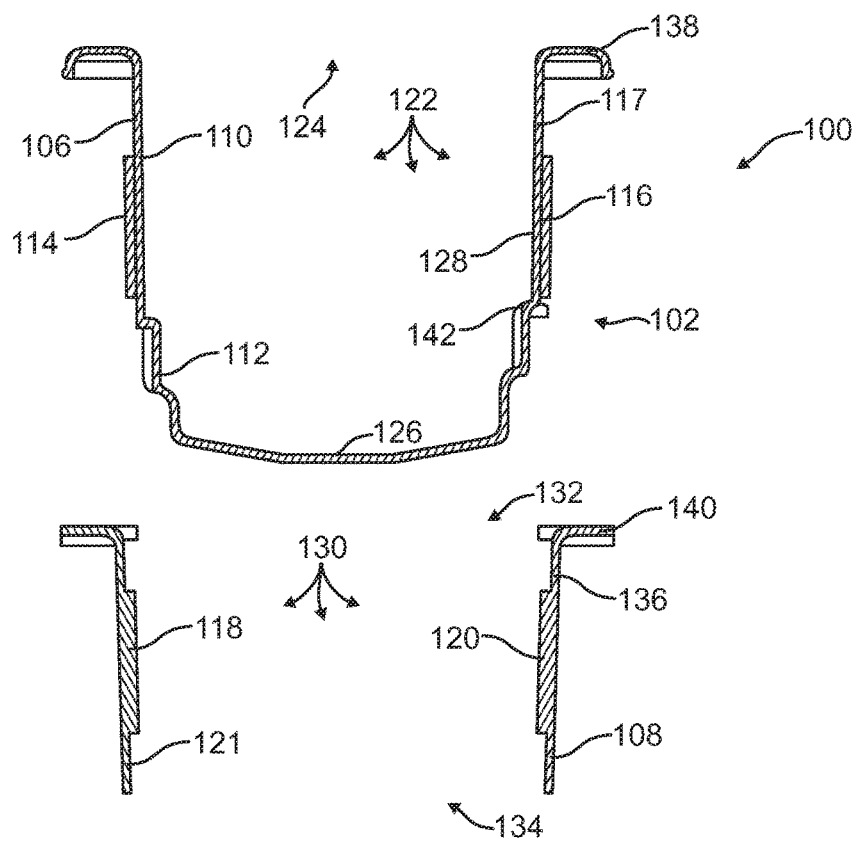
FIG. 2 illustrates a cross sectional view of the drink holder assembly shown in FIG. 1 where the drink holder has been removed from the support holder of the drink holder assembly.
Figure 3:
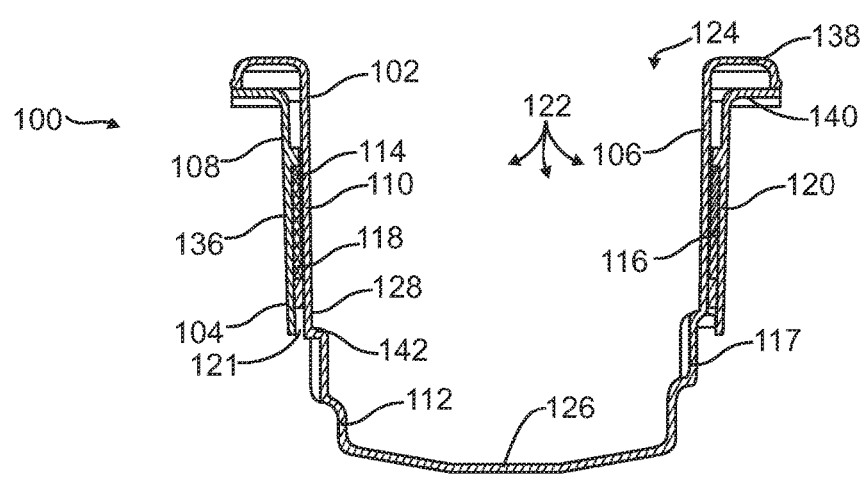
FIG. 3 illustrates a cross sectional view of the drink holder assembly shown in FIG. 1 where the drink holder is being held by the support holder of the drink holder assembly.

FIG. 1, FIG. 2, and FIG. 3 illustrate an example of an exemplary drink holder assembly 100. The drink holder assembly 100 includes a drink holder 102 and a support holder 104. The drink holder 102 is configured to hold a beverage container. In this embodiment, the drink holder 102 includes a beverage container receptacle 106. A user can thus insert the beverage container into the beverage container receptacle 106 so that the beverage container is held within the beverage container receptacle 106.

As explained in further detail below, the support holder 104 is configured to hold the drink holder 102 such that the drink holder 102 is removeably secured to the support holder 104. The support holder 104 can be attached to a structure, which allows for the drink holder assembly to provide a stable location for a user to store their beverage container. For example, the support holder 104 may be secured to a vehicle such as in the console of an automobile or boat. The drink holder 102 may be inserted and removeably secured within the support holder 104 so that the drink holder assembly 100 provides a stable place to hold the beverage container in the vehicle. However, the drink holder 102 can be detached and is thus portable. In this manner, the user can carry the beverage container in the drinker holder and thereby enjoy the beverage outside of the vehicle. The support holder 104 can be secured to a structure using any suitable securement mechanism and/or substance, such as screws, bolts, Velcro, adhesives, brackets, and/or the like. In fact, any known material or mechanism known for attaching a drink holder to a vehicle can be used to attach the support holder 104. Also, in some embodiments, the support holder 104 may be integrated and be part of the structure (e.g., vehicle) and thereby not require specific securement mechanism and/or adhesive to secure the support holder 104 to the vehicle.

In this embodiment, the support holder 104 includes a support sleeve 108. The beverage container receptacle 106 is insertable into the support sleeve 108 so that the support sleeve 108 holds and removeably secures the beverage container receptacle 106. In this embodiment, the beverage container receptacle 106 is cylindrical and thus so is the support sleeve 108. However, as shown in FIG. 1, the beverage container receptacle 106 has an upper section 110 and a lower section 112, which have significantly discontinuous diameters. More specifically, the upper section 110 has a larger diameter than the lower section 112. In one example, the lower section 112 of the beverage container receptacle 106 may be sized to hold a standard 12 ounce soft drink can. The upper section 110 of the beverage container receptacle 106 may have a larger diameter to accommodate larger drinks. It should be noted that alternative embodiments of the beverage container receptacle 106 and the support sleeve 108 may have any suitable shape depending on the dimensions of the beverage containers that are to be held within the beverage container receptacle 106.

As shown in FIG. 1, the drinker holder 102 has a connector 114 and a connector 116. More specifically, the connector 114 and the connector 116 are provided on the exterior of the beverage container receptacle 106. In this embodiment, the connector 114 and the connector 116 are oppositely disposed on an exterior surface 117 of the upper section 110 of the beverage container receptacle 106.

FIG. 2 illustrates a cross section of the drink holder 102 and the support holder 104 shown in FIG. 1 with the drink holder 102 detached and out of the support holder 104. As shown in FIG. 2, the support holder 104 includes a connector 118 and a connector 120. More specifically, the connector 118 and the connector 120 are provided on the interior surface 121 of the support sleeve 108. In this embodiment, the connector 118 and the connector 120 are oppositely disposed on an interior surface 121 of the support sleeve 108. The connector 118 and the connector 120 are provided on the interior of the of the support sleeve 108 such that the connector 114 and the connector 116 on the exterior of the beverage container receptacle 106 are removeably fastened to the connector 118 and the connector 120 on the interior of the support sleeve 108.

FIG. 3 illustrates a cross section of the drink holder 102 being held by the support sleeve 108. As shown in FIG. 3, the connector 114 and the connector 116 are provided on the exterior of the beverage container receptacle 106 and the connector 118 and the connector 120 are provided in the interior of the support sleeve 108 such that the connector 114 is removeably fastened to the connector 118 and the connector 116 is removeably fastened to the connector 120.

Referring again to FIG. 1, FIG. 2, and FIG. 3, the beverage container receptacle 106 defines a cavity 122 within the interior of the beverage container receptacle 106 configured to hold the beverage container. The beverage container receptacle 106 furthermore defines an open end 124 at the top of upper section 110 for receiving the beverage container into the cavity 122 and a closed bottom end 126 at the bottom of the lower section 112. The beverage container receptacle 106 defines an interior surface 128 that in turn defines the cavity 122 in the interior of the beverage container receptacle 106. The beverage container receptacle 106 defines the exterior surface 117 on the exterior of the beverage container receptacle 106 and oppositely disposed from the interior surface 128.

Additionally, support sleeve 108 defines a chamber 130 (labeled only in FIG. 2 for the sake of clarity) within the interior of the support sleeve 108 where the beverage container receptacle 106 is provided when the support sleeve 108 is holding the beverage container receptacle 106. The support sleeve 108 furthermore defines an open end 132 (labeled only in FIG. 2 for the sake of clarity) at the top of support sleeve 108 for receiving the beverage container into the chamber 130 and oppositely disposed open end 134 (labeled only in FIG. 2 for the sake of clarity) at the bottom of the support sleeve 108, which the beverage container receptacle 106 passes through until the support sleeve 108 engages and holds the beverage container receptacle 106. The support sleeve 108 defines the interior surface 121 that in turn defines the chamber 130 in the interior of the beverage container receptacle 106. The support sleeve 108 defines an exterior surface 136 on the exterior of the support sleeve 108 and oppositely disposed from the interior surface 121.

In this embodiment, the diameter of the chamber 130 of the support sleeve 108 at the interior surface 121 is approximately equal to the diameter of the upper section 110 of the beverage container receptacle 106 at the exterior surface 117. As such, the interior surface 121 of the support sleeve 108 engages the exterior surface 117 of the beverage container receptacle 106 such that the support sleeve 108 holds the beverage container receptacle 106. In this example, the connector 114 and the connector 116 are positioned on the upper portion 110 at the exterior surface 117 of the beverage container receptacle 106 so as to be removeably fastened to the connector 118 and the connector 120 on the interior surface 121 of the support sleeve 108 once the interior surface 121 engages the exterior surface 117.

The connectors 114, 116, 118, 120 may make any suitable type of attachment mechanism or attachment mechanism capable of removeably securing the support holder 104 to the support sleeve 108. For example, the connectors 114, 116, 118, 120 may form an interlocking mechanism. Thus, the connector 114 may be an interlocking connector and the connector 118 may be interlocking connector that forms an interlocking mechanism. Similarly, the interlocking connector 116 may be an interlocking connector 120 and the interlocking connector 120 that forms the same or a different type of interlocking mechanism. For example, the connectors 114, 116, 118, 120 may be male and female connectors of a twist lock mechanism as explained in further detail below.

As shown in FIG. 1, FIG. 2, and FIG. 3, the drink holder 102 includes a flange 138 that extends laterally out of the open end 124 of beverage container receptacle 106 past the exterior. The support holder 104 includes a flange 140 that extends out of the open end 132 at the top of the support sleeve 108. The flange 140 may be designed to rest on and be substantially flush with the surface of the structure (e.g. the console of an automobile or boat) that the support sleeve 108 is attached to. The flange 138 of the drink holder 102 is preferably configured to cover the flange 140 of support holder 104. In this manner, the flange 138 fits neatly and snugly on the flange 140 and thereby further helps maintain the beverage container receptacle 106 removeably secured to the support sleeve 108. In this embodiment, the flanges 138, 140 are circular in cross section. However, in alternative embodiments, the flanges 138, 140 may have cross sections of any other suitable shape such as, for example, decorative shapes like a star shape, the shape of a cross, and/or the like.

As mentioned above, in some embodiments, the beverage container receptacle 106 is divided into the upper section 110 and the lower section 112, which have different diameters. Thus, the beverage container receptacle 106 has a cross sectional area that is reduced between the open end 124 and the closed end 126 so as to define a ridge 142 on the exterior surface 117. In this embodiment, the ridge 142 is also defined by the interior surface 128 so as to extend into the cavity 122 at the bottom of the upper section 110. This thereby reduced the diameter of the cavity 122 from the upper section 110 and the lower section 112. The reduction of the diameter also results in the lower portion past the open end 134 of the support sleeve 108 when the beverage container receptacle 106 is being held within the support sleeve 108.

Figure 4:
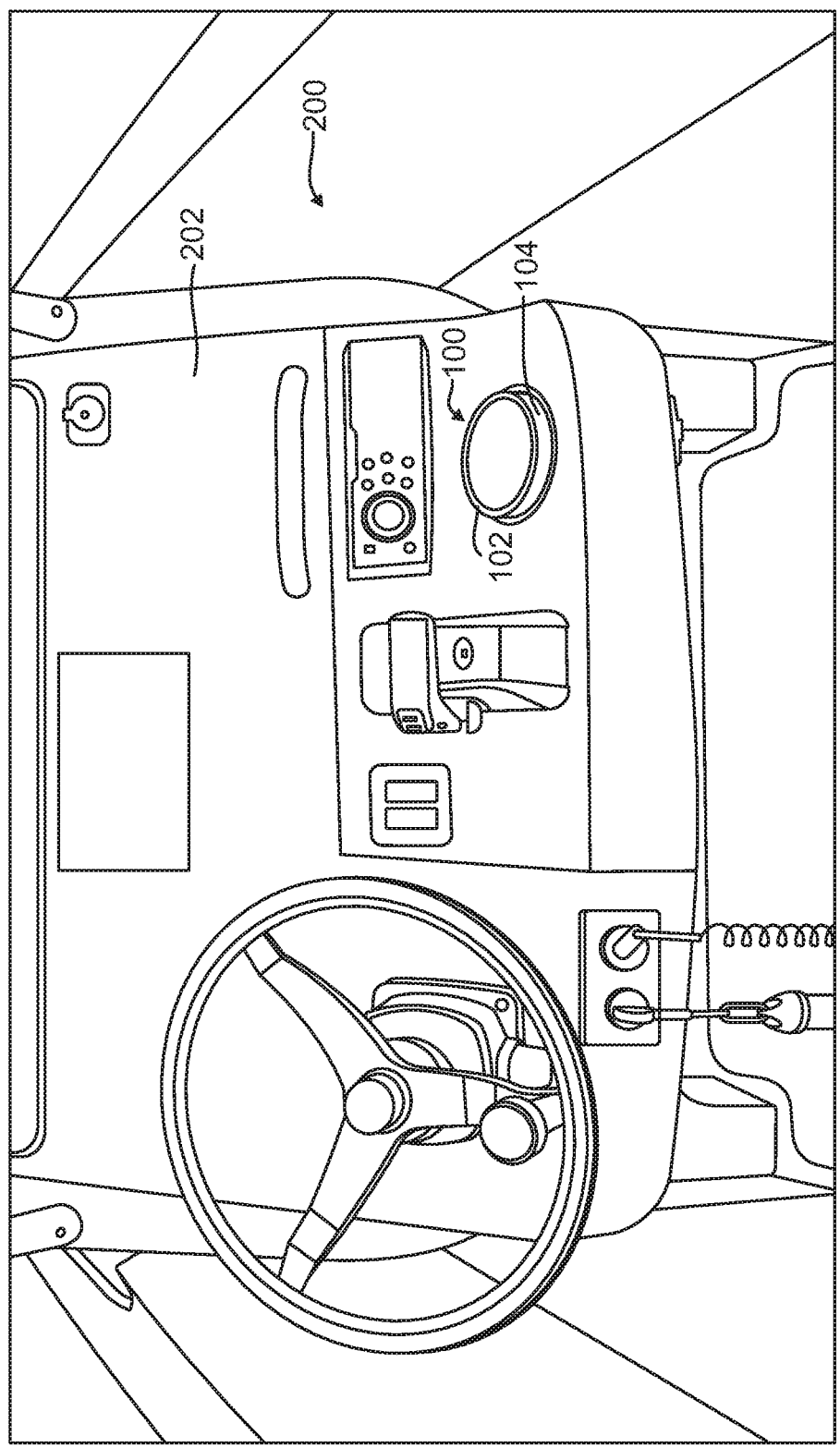
FIG. 4 illustrates the drink holder assembly shown in FIGS. 1-3 in the console of a vehicle.

FIG. 4 illustrates one embodiment of the drink holder assembly 100 shown in FIG. 2, where the support holder 104 has been mounted to a vehicle 200 (which in this example is a boat). More specifically, the vehicle 200 has a console 202 in the interior of the vehicle 200. The support holder 104 has been mounted in a fixed manner to the console 202. For example, the support holder 104 may be screwed, glued, or be integrated with the console 202. The bottom of the flange 140 (shown in FIG. 1, FIG. 2, FIG. 3) rests on a surface of the console. As shown in FIG. 4, the beverage container receptacle 106 has been inserted into the support sleeve 108 so that the beverage container receptacle 106 is removeably attached to the support sleeve 108. Accordingly, the flange 138 of the drink holder 102 is covering the flange 140 of the support holder 104 (See FIG. 3). The beverage container receptacle 106 can be detached so that a user can carry off the drink holder 102 while the support holder 104 remains fixed to the console 102 of the vehicle 200.

Figure 5:
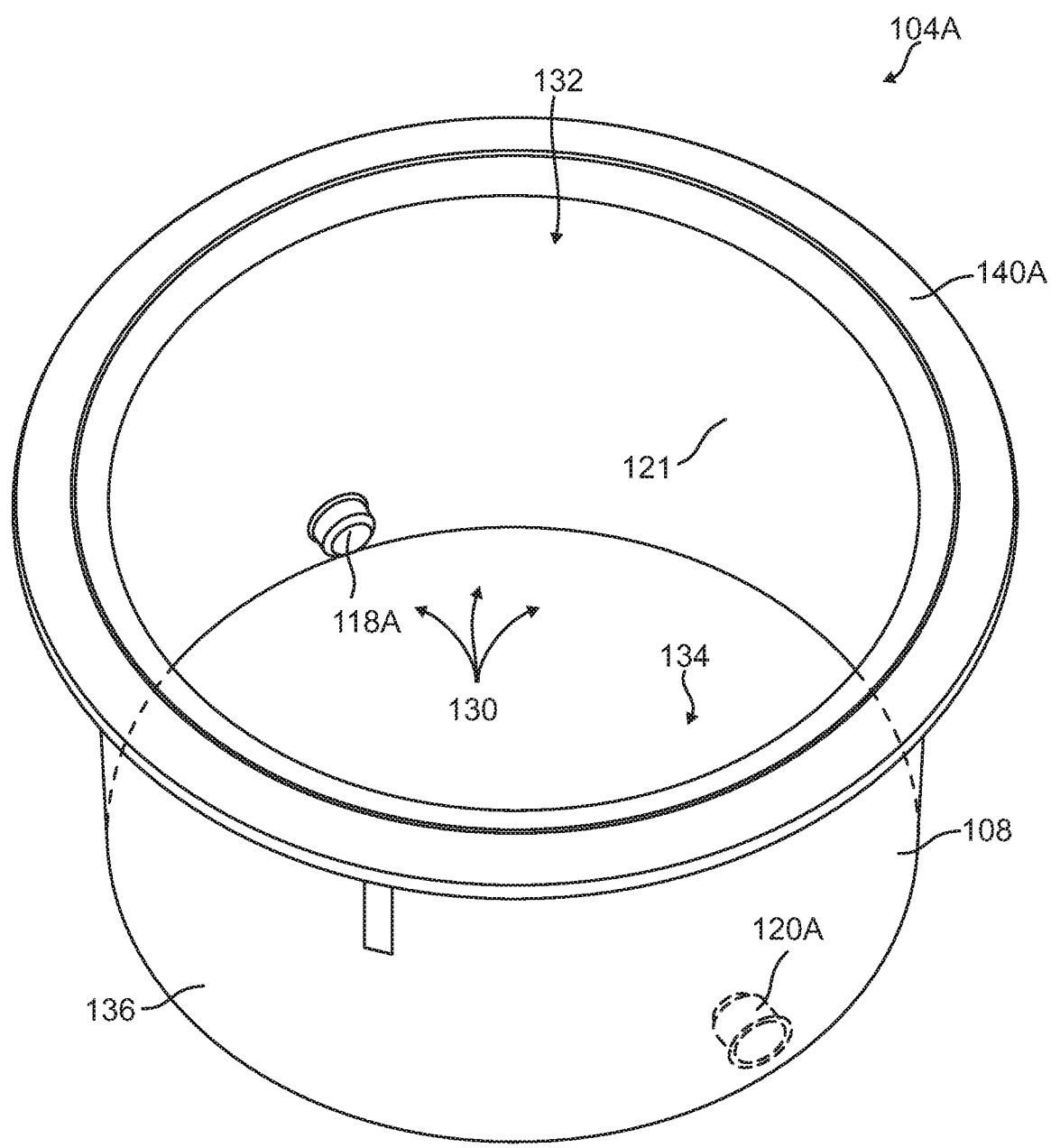
FIG. 5 illustrates one embodiment of a support holder.

FIG. 5 illustrates one embodiment of a support holder 104A. The support holder 104A is an embodiment of the support holder 104 that could be used as shown in FIG. 1, FIG. 2, FIG. 3, and FIG. 4. The support holder 104A includes the support sleeve 108, interior surface 121, the chamber 130, the open end 132, the open end 134, and the exterior surface 136, as described above. Furthermore, the support holder 104A includes a connector 118A, a connector 120A, and a flange 140A. The connector 118A is one embodiment of the connector 118 and the connector 120A is one embodiment of the connector 120 described above with respect to FIG. 1, FIG. 2, and FIG. 3. In this embodiment, the connector 118A is a male twist lock connector and the connector 120A is a male twist lock connector. Note that in this embodiment, the connector 118A and the connector 120A are provided on the interior surface 121 near the open end 134. This is so the connector 118A and the connector 120A will slide into the female twist lock connector on the beverage container receptacle 106 once the beverage container receptacle 106 has been fully inserted into the support sleeve 108. Otherwise, the connector 118A and the connector 120A may interfere with the insertion of the beverage container receptacle 106 since the connector 118A and the connector 120A extend into the chamber 130.

The flange 140A is configured to rest on the surface of the structure that supports the drink holder assembly 100. The flange 140A is one embodiment of the flange 140, shown in FIG. 1, FIG. 2, and FIG. 3. In this embodiment, the flange 140A has a circular cross sectional area since the flange 140A extends out of the exterior surface 136 at the open end 132 and the open end 132 has a circular cross sectional area. In alternative embodiments, the open end 132 and/or the flange 140A may have a cross sectional area of a different shape depending on the design and/or the desired ornamental characteristics. In this embodiment, the flange 140A may be glued to the surface of the support within a vehicle with an adhesive or may not be attached at all.

Figure 6:
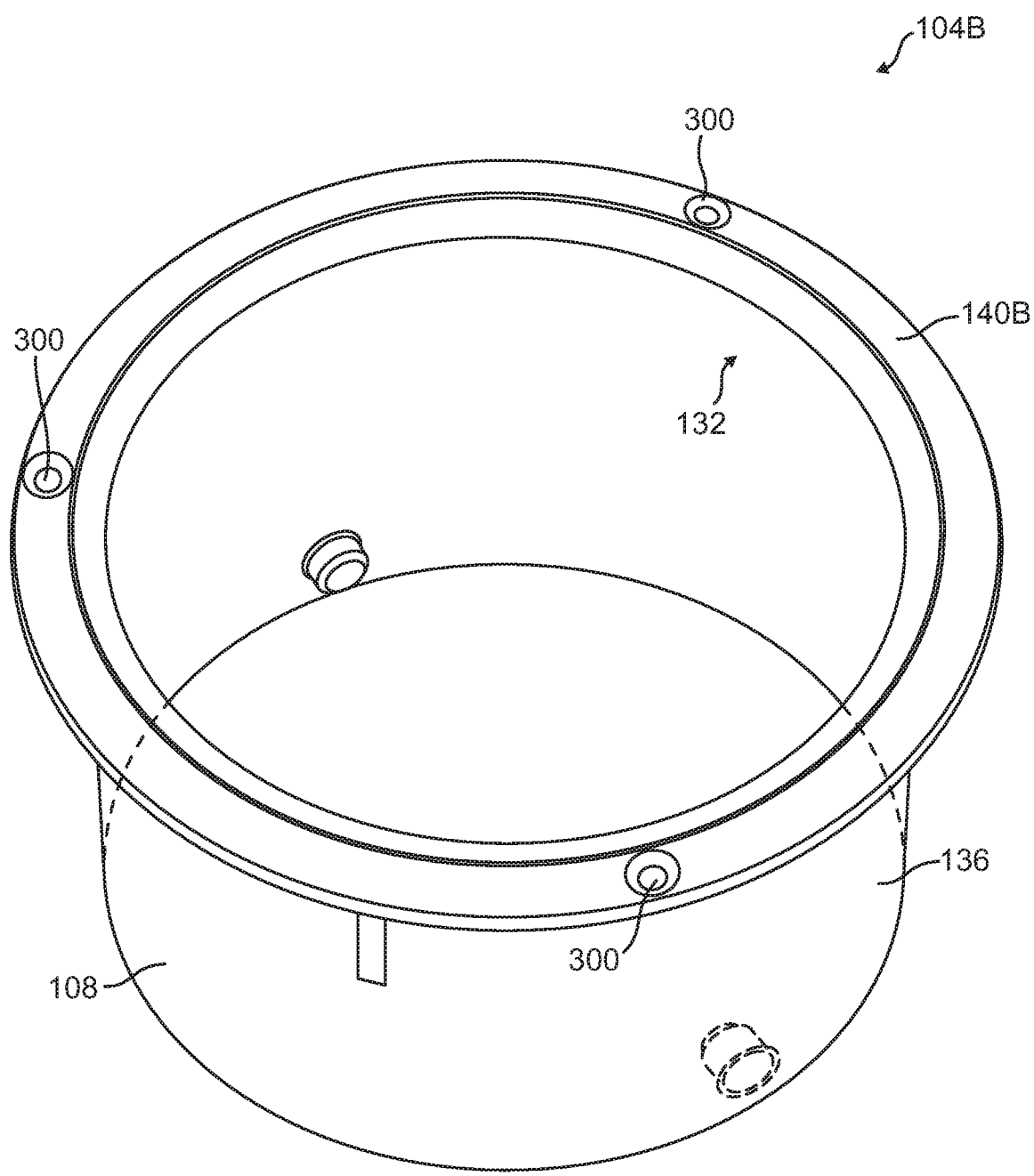
FIG. 6 illustrates another embodiment of a support holder.

FIG. 6 illustrates one embodiment of the support holder 104B. The support holder 104B is an embodiment of the support holder 104 shown in FIG. 1, FIG. 2, FIG. 3, and FIG. 4. In addition, the support holder 104B includes the connector 118A and the connector 120A described above in FIG. 5.

The flange 140B is configured to rest on the surface of the structure that supports the drink holder assembly 100. The flange 140B is one embodiment of the flange 140, shown in FIG. 1, FIG. 2, and FIG. 3. In this embodiment, the flange 140B has a circular cross sectional area since the flange 140B extends out of the exterior surface 136 at the open end 132 and the open end 132 has a circular cross sectional area. In alternative embodiments, the open end 132 and/or the flange 140B may have a cross sectional area of a different shape depending on the design and/or the desired ornamental characteristics. In this embodiment, the flange 140B includes apertures 300. The apertures 300 are designed to fit a screw or a bolt. In this manner, the support holder 104B can be attached to the surface of the structure support it. In this embodiment, there are three of the apertures 300, which are positioned approximately 120 degrees apart from one another on the flange 140B.

Figure 7:
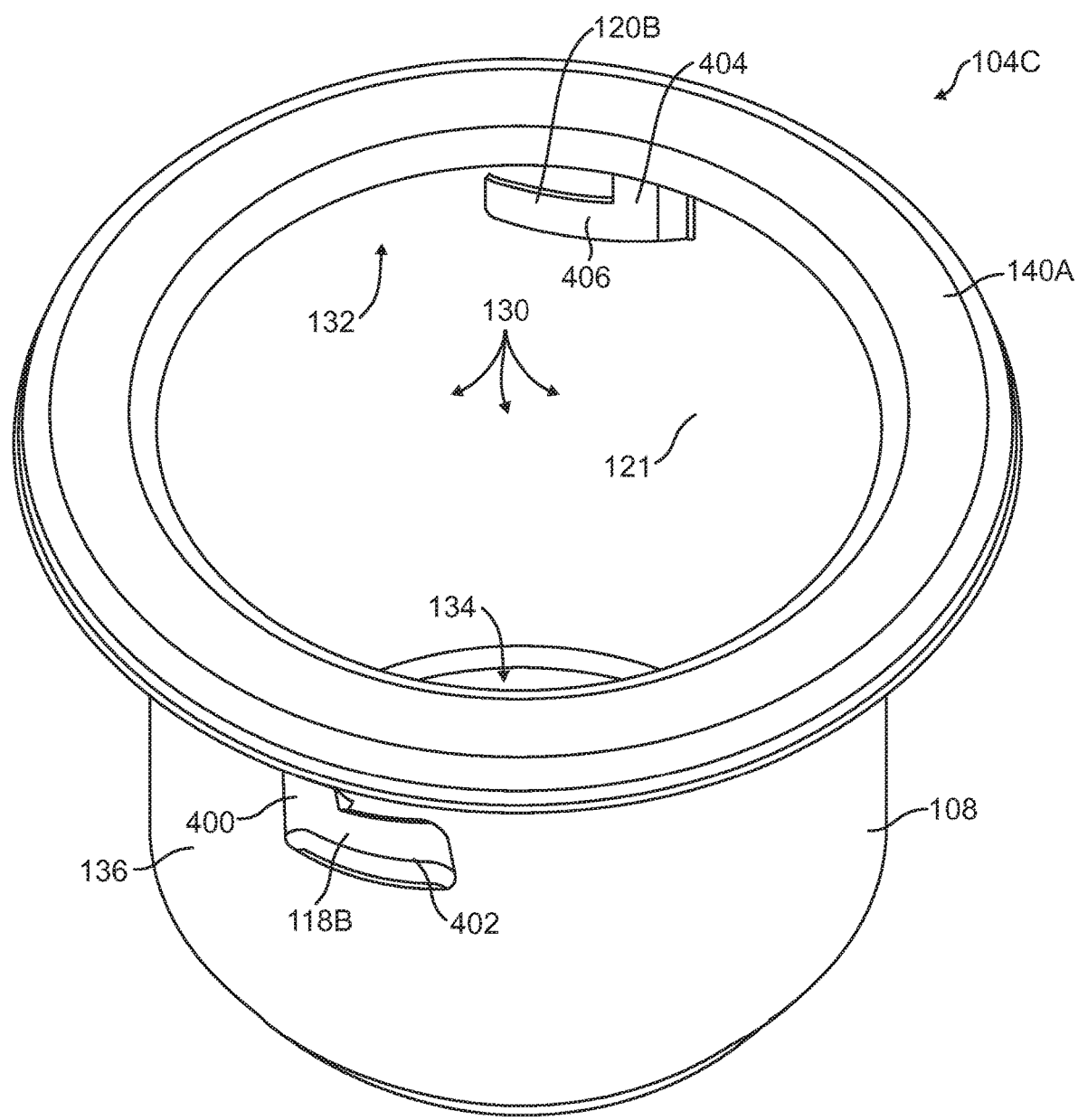
FIG. 7 illustrates still another embodiment of a support holder.

FIG. 7 illustrates one embodiment of a support holder 104C. The support holder 104C is an embodiment of the support holder 104 shown in FIG. 1, FIG. 2, FIG. 3, and FIG. 4. The support holder 104C includes the support sleeve 108, interior surface 121, the chamber 130, the open end 132, the open end 134, and the exterior surface 136, as described above. Furthermore, the support holder 104C includes a connector 118B, a connector 120B, and the flange 140A. The flange 140A was described above with respect to FIG. 5. The connector 118B is one embodiment of the connector 118 and the connector 120B is one embodiment of the connector 120B described above with respect to FIG. 1, FIG. 2, and FIG. 3. In this embodiment, the connector 118B is a female twist lock connector and the connector 120B is a female twist lock connector. Note that in this embodiment, the connector 118B and the connector 120B are provided on the interior surface 121 near the open end 132. This is so the connector 118B and the connector 120B allow for the male twist lock connector on the beverage container receptacle 106 to be inserted when the beverage container receptacle 106 has been fully inserted into the support sleeve 108.

As shown in FIG. 7, the connector 1188 includes a vertical passage 400 and a horizontal passage 402. (In FIG. 7, the connector 118B is on the interior surface 121 but shown bubbling out of the exterior. The corresponding components discussed in this paragraph are actually not explicitly shown but rather the portions bubbling out that correspond to the discussed features are labeled. It should be noted that in alternative embodiments, the connector 118B does not bubble out of the exterior but rather the surface on the exterior is substantially flush.) Each of the passages 400, 402 is connected so that the connector 118B is provided in an L-shape that is formed as grooves on the interior surface 121. The vertical passage 400 provides an entry into the connector 118B at the open end 132 of the support sleeve 108. In this manner, a male twist lock connector is inserted into the vertical passage 400 and then the drink holder 102 is twisted so that that the male twist lock connector is inserted into the horizontal passage 402.

Additionally, the connector 120B includes a vertical passage 404 and a horizontal passage 406. Each of the passages 404, 406 is connected so that the connector 120B is provided in an L-shape that is formed as grooves on the interior surface 121. The vertical passage 404 provides an entry into the connector 120B at the open end 132 of the support sleeve 108. In this manner, a male twist lock connector is inserted into the vertical passage 404 and then the drink holder 102 is twisted so that that the male twist lock connector is inserted into the horizontal passage 406. Although many of the embodiments show two connection points, more or less can be used.

Figure 8:
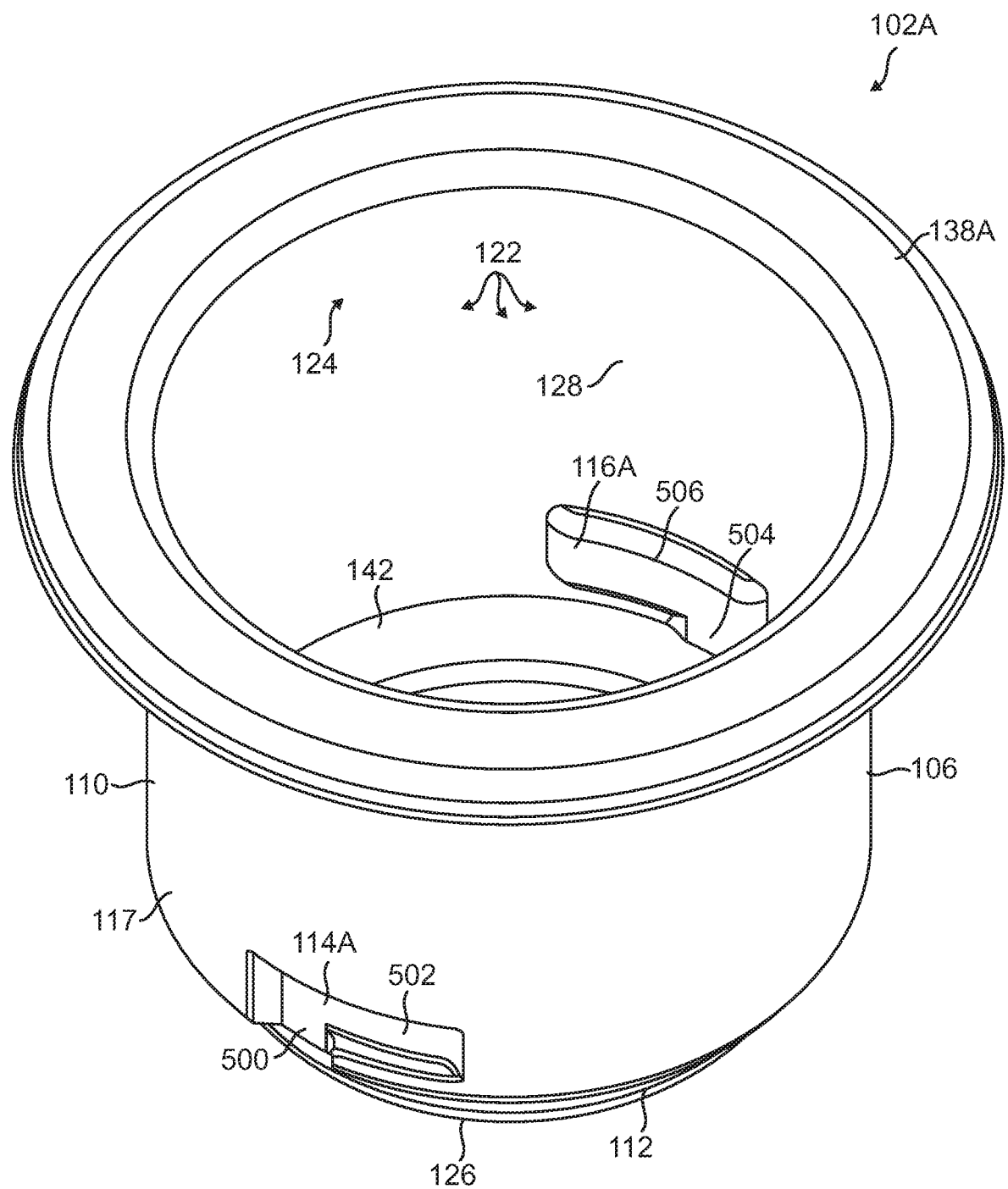
FIG. 8 illustrates an embodiment of a drink holder.

FIG. 8 illustrates one embodiment of a drink holder 102A. The drink holder 102A is an embodiment of the drink holder 102 that could be used as shown in FIG. 1, FIG. 2, FIG. 3, and FIG. 4. The drink holder 102A includes the beverage container receptacle 106, the upper section 110, the lower section 112, the exterior surface 117, the cavity 122, the open end 124, the closed end 126, the interior surface 128, and the ridge 142 as described above. Furthermore, the drink holder 102A includes a connector 114A, a connector 116A, and a flange 138A. The connector 114A is one embodiment of the connector 114 and the connector 116A is one embodiment of the connector 116 described above with respect to FIG. 1, FIG. 2, and FIG. 3. In this embodiment, the connector 114A is a female twist lock connector and the connector 116A is a female twist lock connector. Note that in this embodiment, the connector 114A and the connector 116A are provided on the exterior surface 117 near the open end 132. This is so the connector 114A and the connector 116A allow for the male twist lock connector on the support sleeve 108 to be inserted when the beverage container receptacle 106 has been fully inserted into the support sleeve 108.

The flange 138A is configured to rest over the flange 140, which was discussed above with respect to FIG. 1, FIG. 2, and FIG. 3. The flange 138A is one embodiment of the flange 138, shown in FIG. 1, FIG. 2, and FIG. 3. In this embodiment, the flange 138A has a circular cross sectional area since the flange 138A extends out of the exterior surface 117 at the open end 124 and the open end 124 has a circular cross sectional area. In alternative embodiments, the open end 124 and/or the flange 138A may have a cross sectional area of a different shape depending on the design and/or the desired ornamental characteristics.

As shown in FIG. 8, the connector 114A includes a vertical passage 500 and a horizontal passage 502. Each of the passages 500, 502 is connected so that the connector 114A is provided in an L-shape that is formed as grooves on the exterior surface 117. The vertical passage 500 provides an entry into the connector 114A at the bottom of the upper section 110 of the beverage container receptacle 106. In this manner, a male twist lock connector is inserted into the vertical passage 500 and then the drink holder 102 is twisted so that that the male twist lock connector is inserted into the horizontal passage 502.

Additionally, the connector 116A includes a vertical passage 504 and a horizontal passage 506. (In FIG. 8, the connector 116A is on the exterior surface 117 but shown bubbling out the interior surface 128. The corresponding components discussed in this paragraph are actually not explicitly shown but rather the portions bubbling out that correspond to the discussed features are labeled. It should be noted that in alternative embodiments, the interior surface 128 is substantially flush.) Each of the passages 504, 506 is connected so that the connector 116A is provided in an L-shape that is formed as grooves on the exterior surface 117. The vertical passage 504 provides an entry into the connector 116A at the bottom of the upper section of the beverage container receptacle 106. In this manner, a male twist lock connector is inserted into the vertical passage 504 and then the drink holder 102 is twisted so that that the male twist lock connector is inserted into the horizontal passage 506.

Figure 9:
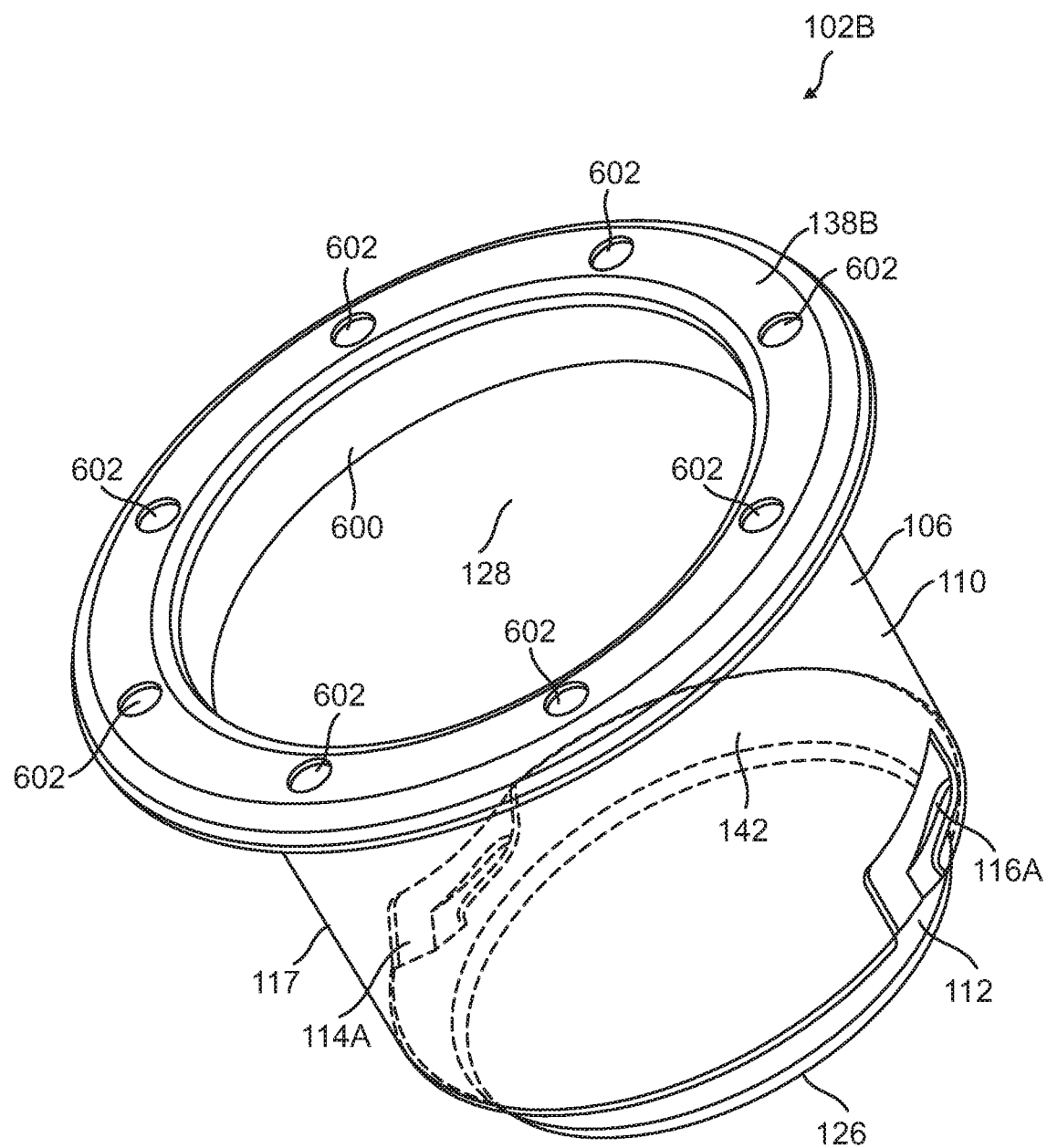
FIG. 9 illustrates another embodiment of a drink holder.

FIG. 9 illustrates one embodiment of the drink holder 102B. The drink holder 102B is an embodiment of the drink holder 102 that could be used shown in FIG. 1, FIG. 2, FIG. 3, and FIG. 4. The drink holder 102B includes the connector 114A and the connector 116A, which were described above with respect to FIG. 8.

Additionally, the drink holder 102 includes a flange 138B. The flange 138B is configured to rest over the flange 140, which was discussed above with respect to FIG. 1, FIG. 2, and FIG. 3. The flange 138B is one embodiment of the flange 138, shown in FIG. 1, FIG. 2, and FIG. 3. In this embodiment, the flange 138B has a circular cross sectional area since the flange 1388 extends out of the exterior surface 117 at the open end 124 and the open end 124 has a circular cross sectional area. In alternative embodiments, the open end 124 and/or the flange 138B may have a cross sectional area of a different shape depending on the design and/or the desired ornamental characteristics.

In this embodiment, the beverage container receptacle 106 defines a groove 600 on the interior surface 128 that is positioned to support a ring insert, which is explained in further detail below. The ring insert can be used to support drink supports, also explained in further detail below. The groove 600 is configured to hold the ring insert in place. In this embodiment, the flange 138B includes a set of glue holes 602 distributed along the top surface of the flange 138B. The glue holes 602 are designed to be filled by a liquid adhesive material that hardens. In this manner, the ring insert can be glued to the top surface of the flange 138B.

Figure 10:
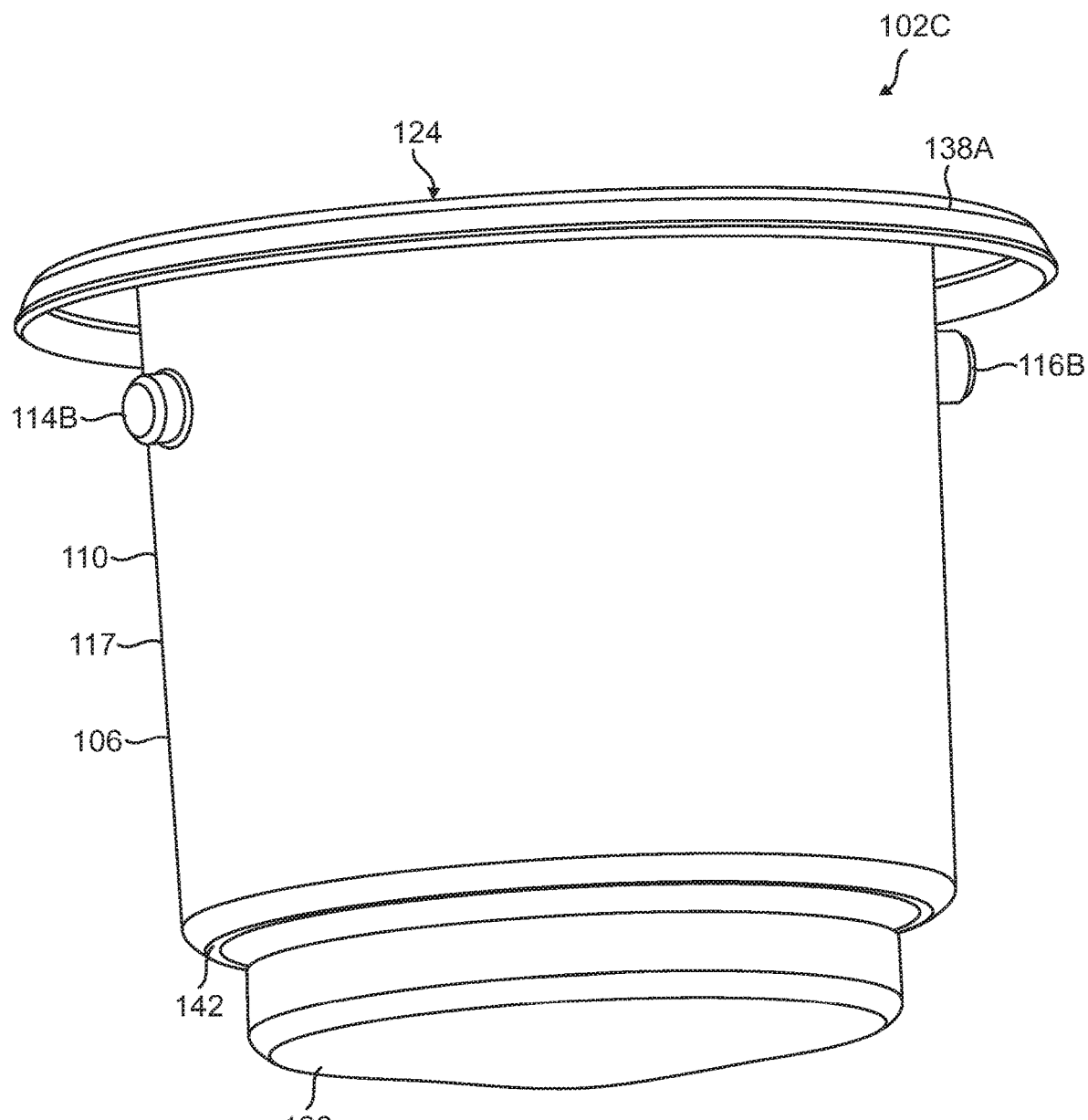
FIG. 10 illustrates still another embodiment of a drink holder.

FIG. 10 illustrates one embodiment of a drink holder 102C. The drink holder 102C is an embodiment of the drink holder 102 that could be used shown in FIG. 1, FIG. 2, FIG. 3, and FIG. 4. The drink holder 102C includes an embodiment of the flange 138A, described above with respect to FIG. 8.

In this embodiment, the connector 114B is a male twist lock connector and the connector 116B is a male twist lock connector. Note that in this embodiment, the connector 114B and the connector 116B are provided on the exterior surface 117 near the open end 124. This is so the connector 114B and the connector 116B will slide into the female twist lock connector on the support sleeve 108 once the beverage container receptacle 106 has been fully inserted into the support sleeve 108. Otherwise, the connector 114B and the connector 116B may interfere with the insertion of the beverage container receptacle 106 since the connector 114B and the connector 116B extend out of the exterior surface 117.

Figure 11:
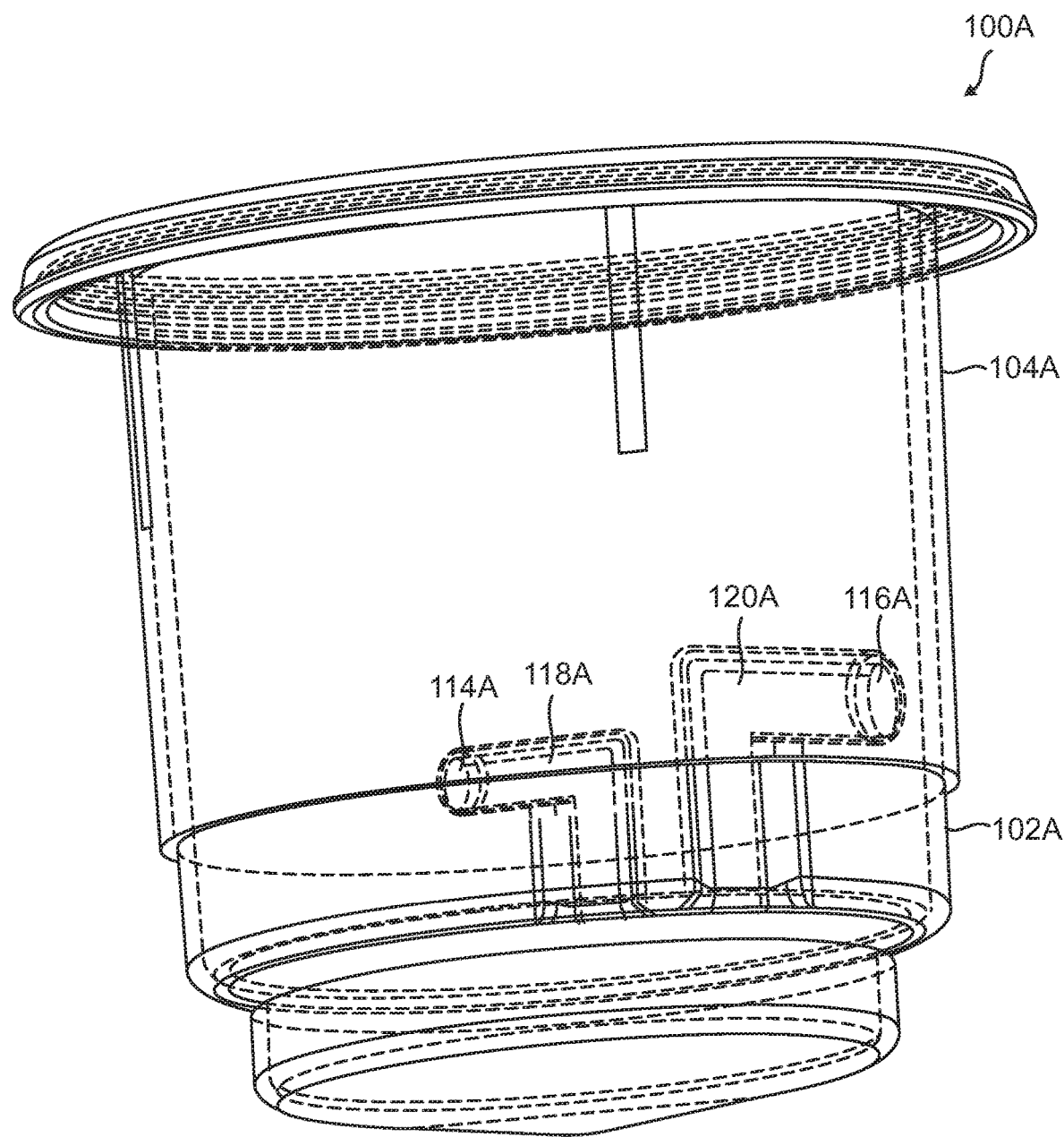
FIG. 11 illustrates an embodiment of the drink holder assembly, which includes the support holder shown in FIG. 5 and the drink holder shown in FIG. 8.

FIG. 11 illustrates an embodiment of a drink holder assembly 100A, which is an example of the drink holder assembly 100 shown in FIG. 1, FIG. 2, FIG. 3, and FIG. 4. In this embodiment, the drink holder assembly 100A includes the drink holder 102A, described above with respect to FIG. 8 and the support holder 104A, which was described above with respect to FIG. 5. As such, the connector 114A is the female twist lock connector and the connector 116A is the female twist lock connector. Thus, the connector 118A is the male twist lock connector and the connector 120A is the male twist lock connector. The drink holder 102A in FIG. 11 is being held by support holder 104A. As shown in FIG. 11, the connector 118A and the connector 120A have been twist locked within the connector 114A and the connector 116A, respectively. As shown in FIG. 11, the flange 138A is covering the flange 140A.

Figure 12:
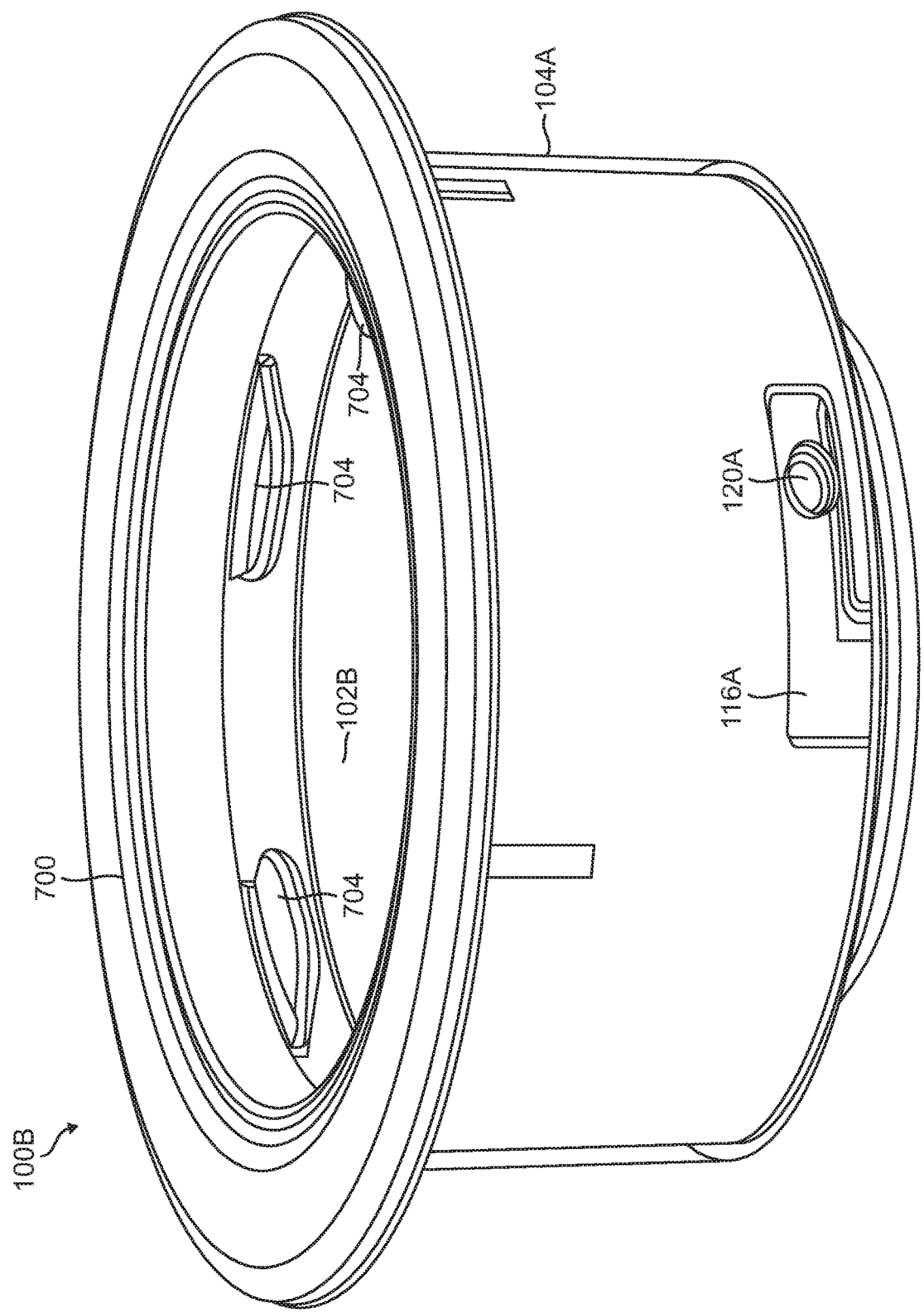
FIG. 12 illustrates another embodiment of the drink holder assembly, which includes the support holder shown in FIG. 5 and the drink holder shown in FIG. 9.

FIG. 12 illustrates an embodiment of a drink holder assembly 100B, which is an example of the drink holder assembly 100 shown in FIG. 1, FIG. 2, FIG. 3, and FIG. 4. In this embodiment, the drink holder assembly 100B includes the drink holder 102B, described above with respect to FIG. 9 and the support holder 104A, which was described above with respect to FIG. 5. As such, the connector 114A (not explicitly shown in FIG. 12) is the female twist lock connector and the connector 116A (shown in the exterior of the drink holder 102B—although the connector 116A is shown through a see through representation of the drink holder assembly 100B, the lines of the connector 116A are not dashed for the sake of clarity) the female twist lock connector. Thus, the connector 118A (not explicitly shown in FIG. 12) is the male twist lock connector and the connector 120A is the male twist lock connector. The drink holder 102B in FIG. 12 is being held by support holder 104A. As shown in FIG. 12, the connector 118A and the connector 120A (shown on the interior of the support holder 104A—although the connector 120A is shown through a see through representation of the drink holder assembly 100B, the lines of the connector 120A are not dashed for the sake of clarity) have been twist locked within the connector 114A and the connector 116A, respectively.

In addition, a ring insert 700 has been provided, which is glued to the flange 138B (shown in FIG. 9) with the glue holes 602 (shown in FIG. 9). Furthermore, the ring insert 700 is held by the groove 600 (shown in FIG. 9). In some embodiment, the ring insert 700 has an interior wall configured to hold the drink supports 704. The drink supports 704 may be made of flexible, semi-rigid materials that can flex and bend to receive different sized beverages, but keep the beverage relatively secure within the beverage container receptacle 106. These structures could also be incorporated directly into the drink holder 102. Other drink retaining devices and structures can be used as known to those of skill in the art, including wires, collapsible arms, foam, etc. In some embodiments, the beverage container receptacle 106 may also have drain holes formed by the closed end 126 to allow fluids to drain. The flange 138B is covering the flange 140A (not explicitly shown in FIG. 12).

Figure 13:
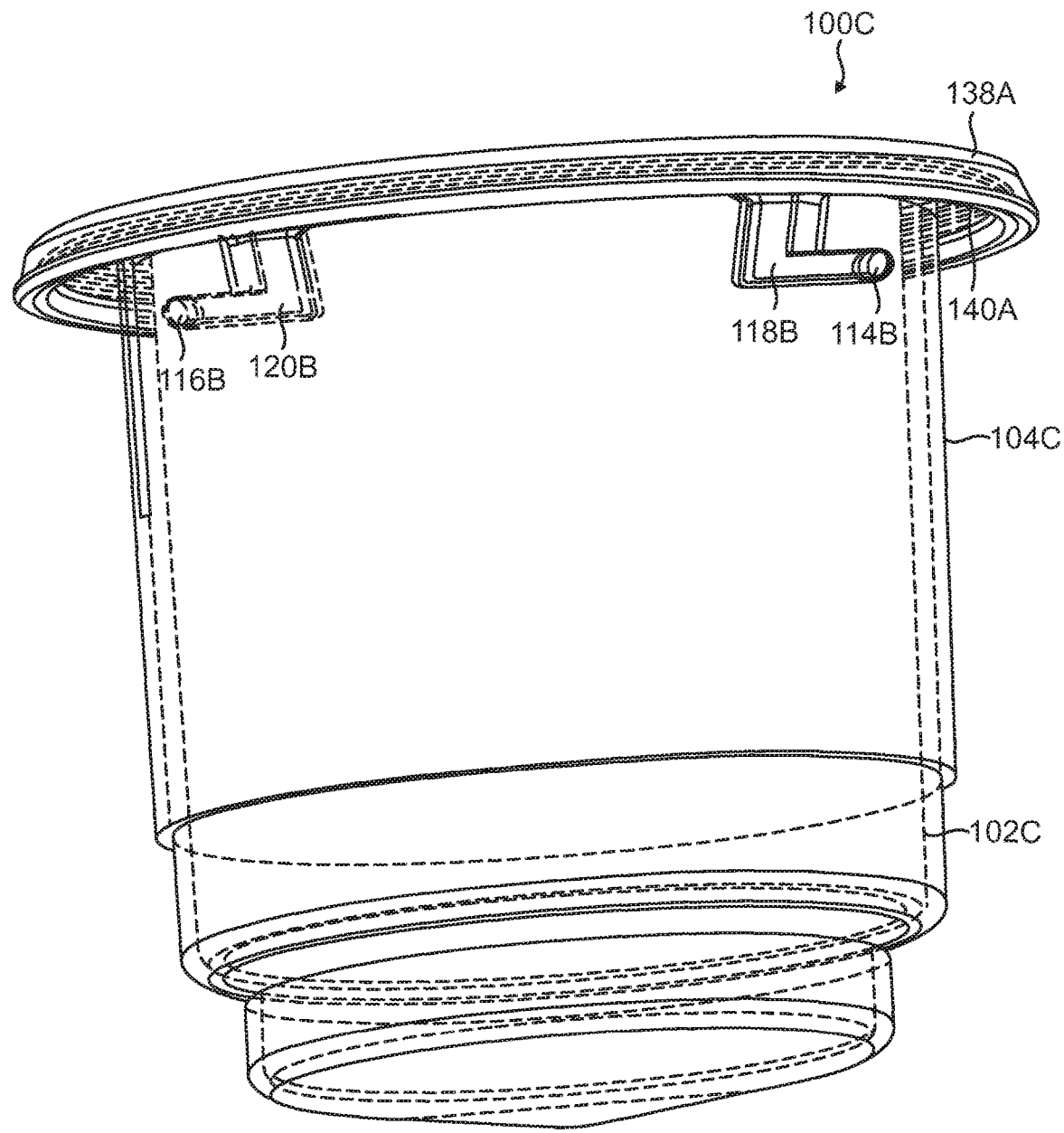
FIG. 13 illustrates still another embodiment of a drink holder assembly, which includes the support holder shown in FIG. 7 and the drink holder shown in FIG. 10.

FIG. 13 illustrates an embodiment of a drink holder assembly 100C, which is an example of the drink holder assembly 100 shown in FIG. 1, FIG. 2, FIG. 3, and FIG. 4. In this embodiment, the drink holder assembly 100C includes the drink holder 102C, described above with respect to FIG. 10 and the support holder 104C, which was described above with respect to FIG. 7. As such, the connector 114B is the male twist lock connector and the connector 116B is the male twist lock connector. Thus, the connector 118B is the female twist lock connector and the connector 120B is the female twist lock connector. The drink holder 102C in FIG. 13 is being held by support holder 104C. As shown in FIG. 13, the connector 114B and the connector 116B, have been twist locked within the connector 118B and the connector 120B respectively. As shown in FIG. 13, the flange 138A is covering the flange 140A.

Those skilled in the art will recognize improvements and modification to the preferred embodiments of the present disclosure. All such improvements and modifications are considered within the scope of the concepts disclosed herein and the claims that follow.

What is claimed is:

1. A drink holder assembly, comprising:
a drink holder comprising a beverage container receptacle and a first twist lock connector; and
a support holder comprising a support sleeve and a second twist lock connector that is antipodal to the first twist lock connector, wherein:
the beverage container receptacle defines an exterior surface and the support sleeve defines an interior surface;
the beverage container receptacle is insertable into the support sleeve such that the interior surface of the support sleeve faces toward the exterior surface of the beverage container receptacle; and
the first twist lock connector is positioned on the exterior surface of the beverage container receptacle and the second twist lock connector is positioned on the interior surface of the support sleeve such that the first twist lock connector and the second twist lock connector are configured to be twist locked and removably fastened when the beverage container receptacle is inserted into the support sleeve.

2. The drink holder assembly of claim 1, wherein:
the drink holder comprises a third connector, wherein the third connector is provided at the exterior of the beverage container receptacle; and
the support holder comprises a fourth connector, wherein the fourth connector is provided in the interior of the support sleeve and the beverage container receptacle is insertable into the support sleeve such that the third connector on the exterior of the beverage container receptacle is removeably fastened to the fourth connector on the interior of the support sleeve.

3. The drink holder assembly of claim 2, wherein:
the third connector comprises a first interlocking connector; and
the fourth connector comprises a second interlocking connector, wherein the first interlocking connector and the second interlocking connector are configured to detachably interlock.

4. The drink holder assembly of claim 3, wherein:
the first interlocking connector comprises a third twist lock connector; and
the second interlocking connector comprises a fourth twist lock connector, wherein the third twist lock connector and the fourth twist lock connector are configured to be twist locked.

5. The drink holder assembly of claim 1, wherein:
the first twist lock connector is a female twist lock connector; and
the second twist lock connector is a male twist lock connector.

6. The drink holder assembly of claim 1, wherein the support holder is mountable to a vehicle.

7. The drink holder assembly of claim 1, wherein:
the support sleeve defines a first open end for receiving the beverage container receptacle;
the beverage container receptacle defines a second open end for receiving a beverage container;
the support holder further comprises a first flange that extends out of the first open end;
the drink holder further comprises a second flange that extends out of the second open end; and
the second flange is configured to cover the first flange.

8. The drink holder assembly of claim 7, further comprising a flange cover configured to cover the first flange.

9. A drink holder assembly, comprising:
a drink holder comprising a beverage container receptacle and a first twist lock connector; and
a support holder configured to hold the drink holder and comprising a support sleeve and a second twist lock connector that is antipodal to the first twist lock connector, wherein:
the beverage container receptacle defines an exterior surface and the support sleeve defines an interior surface;
the beverage container receptacle is insertable into the support sleeve such that the interior surface of the support sleeve faces toward the exterior surface of the beverage container receptacle;
the first twist lock connector is positioned on the exterior surface of the beverage container receptacle and the second twist lock connector is positioned on the interior of the support sleeve such that the first twist lock connector and the second twist lock connector are configured to be twist locked when the beverage container receptacle is inserted into the support sleeve;
the first twist lock connector comprises a first female twist lock connector; and
the second twist lock connector comprises a first male twist lock connector, wherein the first male twist lock connector and the first female twist lock connector are configured to be twist locked.

10. The drink holder assembly of claim 9, wherein:
the support sleeve defines a first open end for receiving the beverage container receptacle and a second open end at the bottom of the support sleeve oppositely disposed from the first open end, wherein the first male twist lock connector is formed proximate the second open end of the support sleeve; and
the beverage container receptacle defines a third open end for receiving a beverage container and a closed end, wherein the first female twist lock connector is positioned on the exterior surface of the beverage container receptacle proximate the closed end of the beverage container receptacle such that the first male twist lock connector is inserted into the first female twist lock connector when the beverage container receptacle is held by the support sleeve.

11. The drink holder assembly of claim 10, wherein the first female twist lock connector defines a vertical passage and a horizontal passage, wherein the vertical passage provides an entry into the first female twist lock connector; and
the beverage container receptacle has a cross sectional area that is reduced between the third open end and the closed end so as to define a ridge on the first exterior surface.

12. A drink holder assembly, comprising:
a drink holder comprising a beverage container receptacle and a first twist lock connector;
a support holder comprising a support sleeve and a second twist lock connector that is antipodal to the first twist lock connector, wherein:
the beverage container receptacle defines an exterior surface and the support sleeve defines an interior surface;
the beverage container receptacle is insertable into the support sleeve such that the interior surface of the support sleeve faces toward the exterior surface of the beverage container receptacle; and
the first twist lock connector is positioned on the exterior surface of the beverage container receptacle and the second twist lock connector is positioned on the interior of the support sleeve such that the first twist lock connector and the second twist lock connector are configured to be twist locked when the beverage container receptacle is inserted into the support sleeve.

* * * * *